US007376795B2

(12) United States Patent
Anand et al.

(10) Patent No.: US 7,376,795 B2
(45) Date of Patent: May 20, 2008

(54) MEMORY COHERENCE PROTOCOL ENHANCEMENT USING CACHE LINE ACCESS FREQUENCIES

(75) Inventors: Vaijayanthiamala K. Anand, Austin, TX (US); Sandra K. Johnson, Austin, TX (US); Kimberly DaShawn Simon, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 11/260,833

(22) Filed: Oct. 27, 2005

(65) Prior Publication Data

US 2007/0101068 A1 May 3, 2007

(51) Int. Cl.
*G06F 13/00* (2006.01)
(52) U.S. Cl. ...................................... 711/141
(58) Field of Classification Search ............... None
See application file for complete search history.

(56) References Cited

U.S. PATENT DOCUMENTS

2005/0120182 A1* 6/2005 Koster et al. ............... 711/141

OTHER PUBLICATIONS

Kaxiras, "Identification and Optimization of Sharing Patterns for Scalable Shared-Memory Multiprocessors," PhD Thesis, Univ. of Wisc.-Madison, 1998.
Grbic, "Assessment of Caching Coherence Protocols in Shared-Memory Multiprocessors," PhD Thesis, Univ. of Toronto, 2003.
Mirza, "Reduction of Cache Coherence Traffic in MP Systems Via Large Block Authority," IBM TDB, vol. 33, No. 2, Jul. 1990, p. 398-406.
Van Fleet, "Automatic Cache Line Monitoring," IBM TDB, Jun. 1994, p. 299-300.
Mukherjee et al., "Using Prediction to Accelerate Coherence Protocols," Proceedings of the 25th Annual. Int'l Symposium on Comp. Arch., 1998, 12 pgs.
Deshpande, "Associative Scheme for Cache Coherence in Multi-Processors," IBM TDB, May 1996, p. 153-156.

(Continued)

*Primary Examiner*—Reginald G. Bragdon
*Assistant Examiner*—Eric S Cardwell
(74) *Attorney, Agent, or Firm*—Van Leeuwen & Van Leeuwen; Matthew W. Baca (57) ABSTRACT

A memory coherence protocol is provided for using cache line access frequencies to dynamically switch from an invalidation protocol to an update protocol. A frequency access count (FAC) is associated with each line of data in a memory area, such as each cache line in a private cache corresponding to a CPU in a multiprocessor system. Each time the line is accessed, the FAC associated with the line is incremented. When the CPU, or process, receives an invalidate signal for a particular line, the CPU checks the FAC for the line. If the CPU, or process, determines that it is a frequent accessor of a particular line that has been modified by another CPU, or process, the CPU sends an update request in order to obtain the modified data. If the CPU is not a frequent accessor of a line that has been modified, the line is simply invalidated in the CPU's memory area. By dynamically switching from an invalidate protocol to an update protocol, based on cache line access frequencies, efficiency is maintained while cache misses are minimized. Preferably, all FACs are periodically reset in order to ensure that the most recent cache line access data in considered.

7 Claims, 7 Drawing Sheets

OTHER PUBLICATIONS

Van Fleet, "Automatic Cache Line Access and Invalidating," IBM TDB, Jun. 1994, p. 565-566.

Liu, "Multiple Read and Exclusive Write State in MP Caches," IBM TDB, Dec. 1991, p. 218-220.

Saulsbury et al., "Recency-Based TLB Preloading," ACM, 2000, p. 117-127.

Nilsson et al., "The Coherence Predictor Cache: A Resource-Efficient and Accurate Coherence Prediction Infrastructure," Proceedings of Int'l Parallel and Distributed Processing Symp., 2003.

Nilsson et al., "An Adaptive Update-Based Cache Coherence Protocol for Reduction of Miss Rate and Traffic," Parallel Arch. & Lang. Europe, Jul. 1994.

* cited by examiner

MEMORY COHERENCE PROTOCOL ENHANCEMENT USING CACHE LINE ACCESS FREQUENCIES

BACKGROUND OF THE INVENTION

1. Technical Field

The present invention relates in general to a system and method for providing memory coherence in a multiprocessor system. In particular, the present invention uses cache line access frequencies to determine when to switch from an invalidation protocol to an update protocol.

2. Description of the Related Art

Cache, or memory, coherence protocols are used in shared memory systems, such as symmetric multiprocessor systems (SMPs), to enable efficient program execution. In such systems, multiple copies of data may exist, for example, in multiple private caches associated with the processors. Each processor in the system may have its own private cache, with the private caches kept coherent with each other. In order to maintain memory coherency between the multiple private caches in an SMP system, a cache coherence protocol is used. Two prior art cache coherence protocols that are used are the Invalidation Protocol and the Update Protocol.

Figure 1:
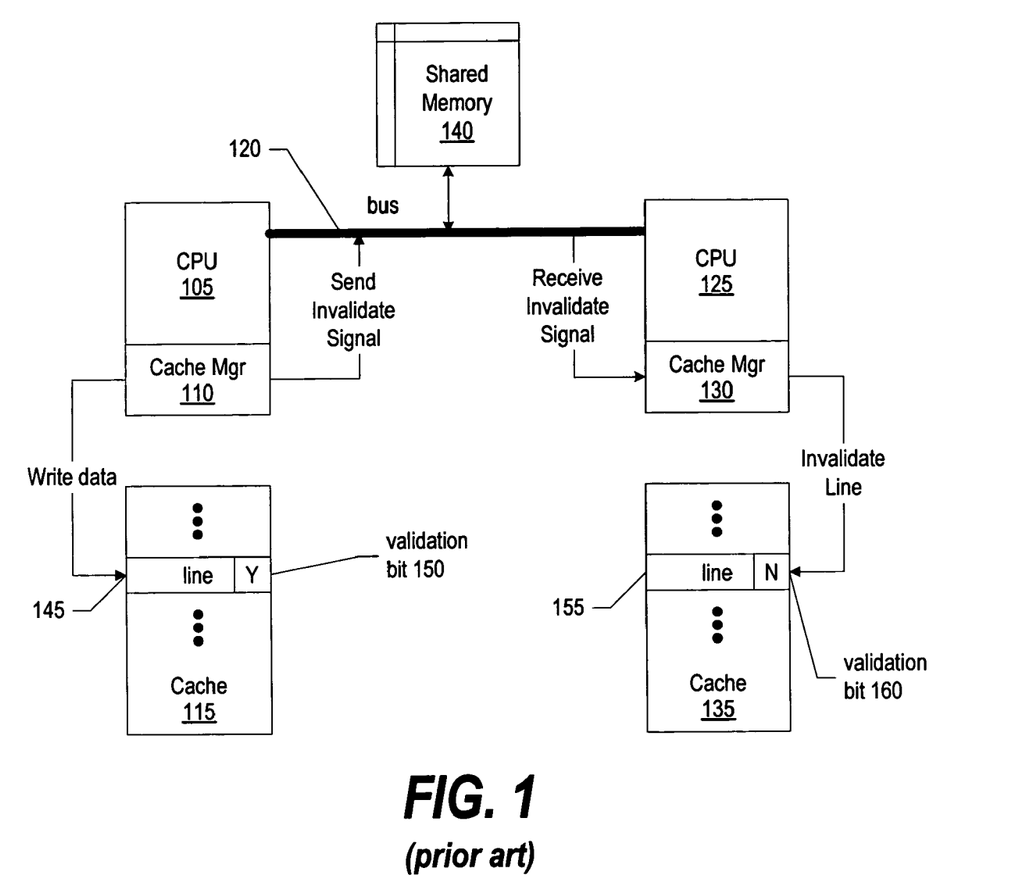
FIG. 1 is a block diagram that depicts a prior art invalidation protocol.

FIG. 1 is a block diagram that depicts a prior art invalidation protocol. Central processing unit (CPU) 105 includes cache manager 110 for controlling access to cache 115. Cache 115 is a private cache used by CPU 105. Similarly, CPU 125 includes cache manager 130 for controlling access to cache 135. Cache 135 is a private cache associated with CPU 125. Cache 115 and cache 135 are kept coherent with each other through the use of an invalidation protocol. CPU 105 and CPU 125 are connected to each other, and to shared memory 140, via bus 120. When CPU 105 writes data to cache 115, all remote copies of the specific cache line (or lines) are invalidated. For example, cache manager 110 writes a line of data to cache line 145 in cache 115. Validation bit 150 is set to "Y" to indicate that the data in cache line 145 is valid. Then, cache manager 110 sends an invalidate signal on bus 120 that tells all other cache managers to invalidate their copy of the cache line. Cache manager 130 receives the invalidate signal from bus 120 and invalidates cache line 155 in its private cache 135. Validation bit 160 is set to "N" to indicate that cache line 155 is not valid.

One problem with the prior art invalidation protocol is that there are situations where the modify requestor (for example, CPU 105 in FIG. 1) is not the process or CPU that most frequently accesses the line. In such instances, cache misses may occur to the private caches of a process or CPU that more frequently accesses the line. For example, CPU 125 will get a cache miss if it attempts to access line 155.

Figure 2:
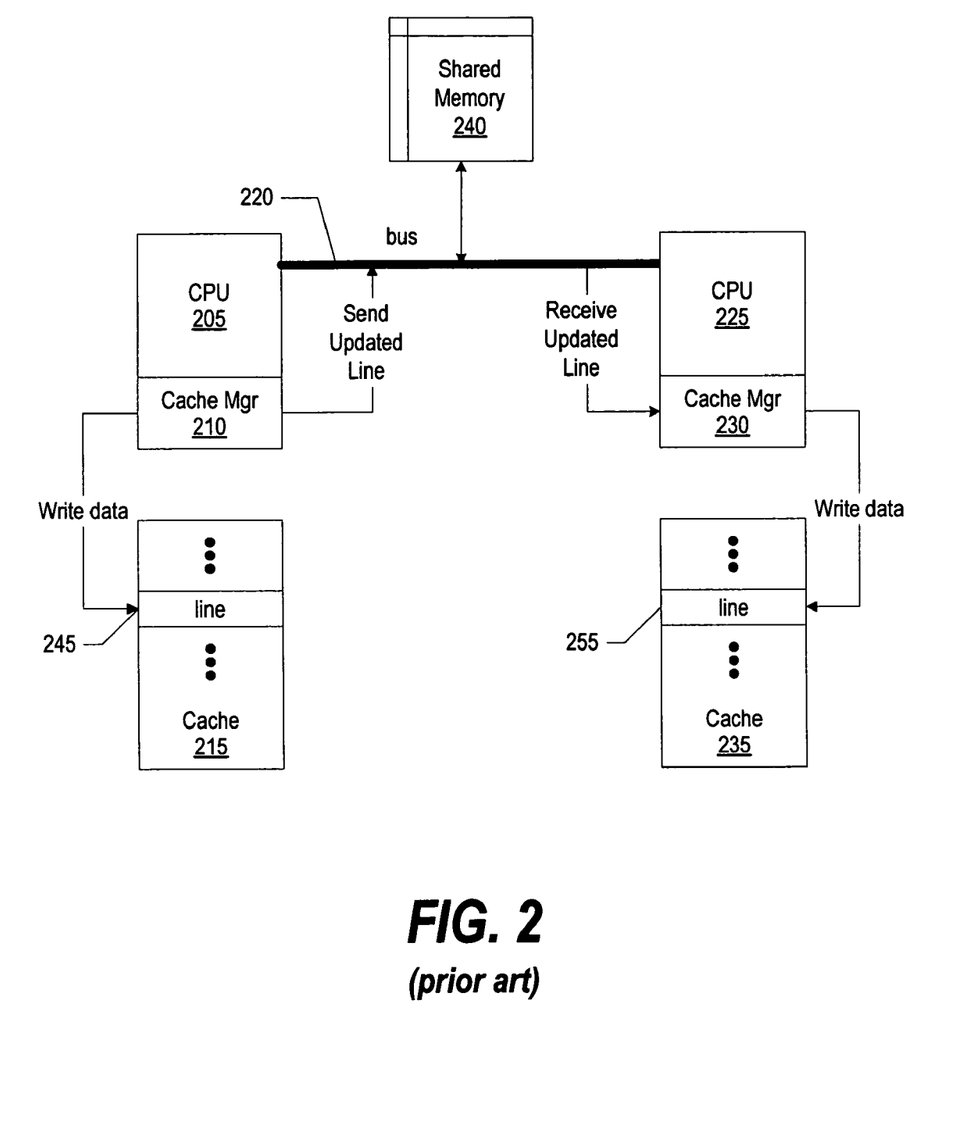
FIG. 2 is a block diagram that depicts a prior art update protocol.

FIG. 2 is a block diagram that depicts a prior art update protocol. CPU 205 includes cache manager 210 for controlling access to cache 215. Cache 215 is a private cache used by CPU 205. Similarly, CPU 225 includes cache manager 230 for controlling access to cache 235. Cache 235 is a private cache associated with CPU 225. Cache 215 and cache 235 are kept coherent with each other through the use of an update protocol. CPU 205 and CPU 225 are connected to each other, and to shared memory 240, via bus 220. When CPU 205 writes data to cache 215, the modified data is broadcast on bus 220 so that other caches with copies of the data can obtain a copy of the modified data. For example, cache manager 210 writes a line of data to cache line 245 in cache 215. Cache manager 210 then broadcasts the updated line by sending the modified data on bus 220. Because CPU 225 has a copy of the particular cache line in its private cache 235, it obtains a copy of the modified data. Cache manager 230 receives the updated data from bus 220, and writes the data to cache line 255 in cache 235.

While the update protocol results in fewer cache misses than the invalidation protocol, it is inefficient, as not every process or CPU will need to keep the modified data in their private cache.

What is needed, therefore, is a system and method for efficient memory coherence in a multiprocessor system.

SUMMARY

It has been discovered that a memory coherence protocol that uses cache line access frequencies to dynamically switch from an invalidation protocol to an update protocol increases efficiency and decreases cache misses. A frequency access count (FAC) is associated with each line of data in a memory area, such as each cache line in a private cache corresponding to a CPU in a multiprocessor system. Each time the line is accessed, either read or modified, the FAC associated with the line is incremented. When the CPU, or process, receives an invalidate signal for a particular line, the CPU checks the FAC for the line. If the FAC is greater than a predetermined threshold, the CPU sends an update request on the bus in order to obtain the modified data. Upon receiving the modified data, the CPU updates its private cache. On the other hand, if the FAC is not greater than the predetermined threshold, the CPU invalidates the line.

An update request is only sent if a CPU, or process, determines that it is a frequent accessor of a particular line that has been modified by another CPU, or process. If a CPU is not a frequent accessor of a cache line that has been modified, the cache line is simply invalidated in the CPU's private cache. By dynamically switching from an invalidate protocol to an update protocol, based on cache line access frequencies, efficiency is maintained while cache misses are minimized. For those cache lines that are not frequently accessed, it is more efficient to simply invalidate them if another CPU modifies them. However, for those cache lines which are frequently accessed, it is more efficient to modify them when they are modified by another CPU.

Any number of CPUs may be present in a system, and may use the memory coherence protocol of the present invention. Those skilled in the art will understand that the memory area modified may include one or more cache lines, a memory segment, or a memory page. Thus, a frequency access count may be associated with one or more lines of data, a memory segment, or a memory page. Preferably, all FACs are periodically reset in order to ensure that the most recent cache line access data is considered. There are many ways in which FACs may be reset. For example, all FACs in all private caches may be reset at a predefined time interval.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

FIGS. 1 and 2 illustrate prior art memory coherence protocols and are discussed in the Background of the Invention section above.

Figure 3:
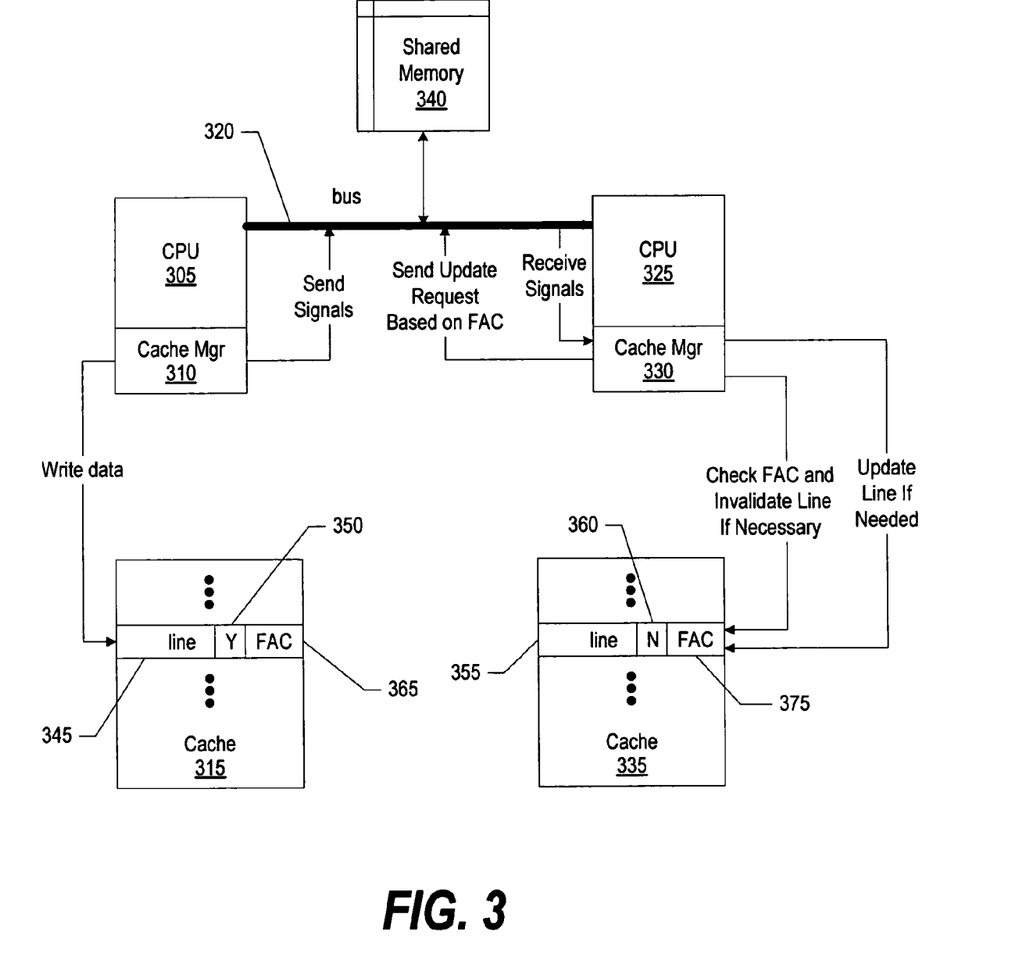
FIG. 3 is a block diagram that depicts a memory coherence protocol using cache line access frequencies.

FIG. 3 is a block diagram that depicts a memory coherence protocol using cache line access frequencies. CPU 305 includes cache manager 310 for controlling access to cache 315. Cache 315 is a private cache used by CPU 305. Similarly, CPU 325 includes cache manager 330 for controlling access to cache 335. Cache 335 is a private cache associated with CPU 325. Cache 315 and cache 335 are kept coherent with each other through the use of frequency access counts, which are used to dynamically switch from an invalidation protocol to an update protocol, as described below.

CPU 305 and CPU 325 are connected to each other, and to shared memory 340, via bus 320. When CPU 305 writes data to cache 315, all remote copies of the specific cache line (or lines) are either invalidated or updated, depending on the cache line access frequencies of the remote copies. For example, cache manager 310 writes a line of data to cache line 345 in cache 315. Note that validation bit 350 has previously been set to "Y" to indicate that the data in cache line 345 is valid, and it remains set to "Y" after the data has been modified. At this point, Frequency Access Count (FAC) 365 is incremented to indicate that cache line 345 has been accessed.

Next, cache manager 310 sends an invalidate signal on bus 320 that tells all other cache managers to check their FACs. Cache manager 330 receives the invalidate signal from bus 320 and checks FAC 375 to determine if CPU 325 frequently accesses this particular line of data. If it is determined that CPU 325 is a frequent accessor of the data, cache manager 330 sends an update request on bus 320. Cache manager 310 receives the update signal and responds by sending the modified data on bus 320. Cache manager 330 receives the modified data and updates cache line 355. If, however, CPU 325 is not a frequent accessor of the data, then cache manager 330 invalidates cache line 355 in its private cache 335. Validation bit 360 is set to "N" to indicate that cache line 355 is not valid.

Note that cache manager 330 only sends an update request if it is determined that CPU 325 is a frequent accessor of the particular cache line that has been modified by CPU 305. If CPU 325 is not a frequent accessor of the cache line that has been modified, the cache line is simply invalidated in private cache 335. By dynamically switching from an invalidate protocol to an update protocol, based on cache line access frequencies, efficiency is maintained while cache misses are minimized. For those cache lines that are not frequently accessed, it is more efficient to simply invalidate them if another CPU modifies them. However, for those cache lines which are frequently accessed, it is more efficient to modify them when they are modified by another CPU (such as CPU 305) as this will minimize cache misses (for example, in CPU 325).

While FIG. 3 depicts a symmetric multiprocessing system with two CPUs, those skilled in the art will understand that any number of CPUs may be present, and may use the memory coherence protocol of the present invention. Further, FIG. 3 uses a single cache line of data to illustrate the updating of data in a private cache. However, those skilled in the art will understand that the memory area modified may include one or more cache lines, a memory segment, or a memory page. Thus, a frequency access count may be associated with one or more lines of data, a memory segment, or a memory page.

Figure 4:
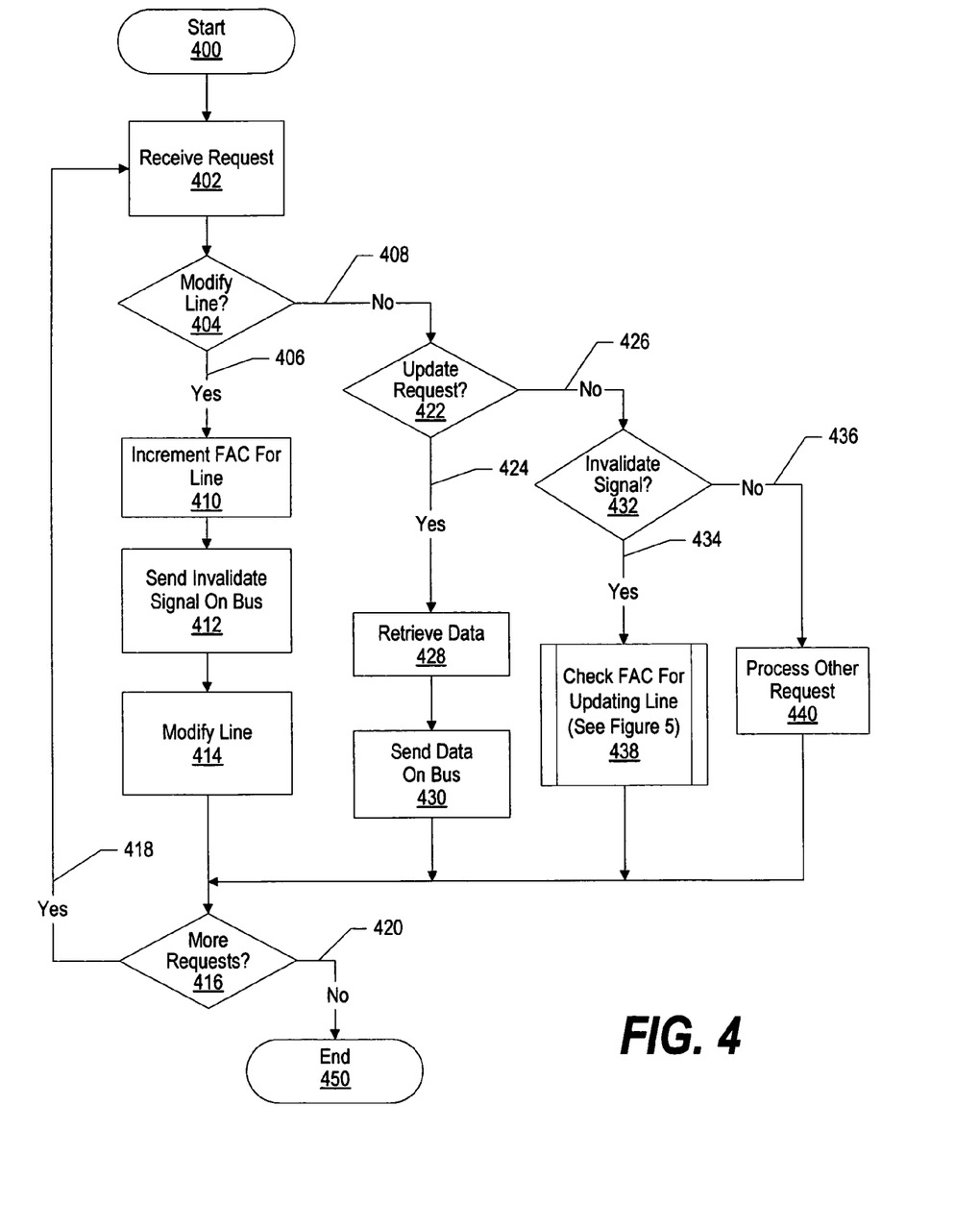
FIG. 4 is a flowchart that depicts modifying a line using the memory coherence protocol of the present invention.

FIG. 4 is a flowchart that depicts modifying a line using the memory coherence protocol of the present invention. Note that a line may be one or more cache lines, a memory segment, or a memory page. Processing commences at 400 whereupon a request is received by a CPU (step 402). A determination is made as to whether the request is a modify line request (decision 404). If the request is a modify line request, decision 404 branches to "yes" branch 406 whereupon the frequency access count (FAC) for the line which is to be modified is incremented (step 410). Preferably, whenever a line is accessed, whether it is read or modified, the FAC is incremented for that line. An invalidate signal is sent on the bus to inform all other CPUs in the system that the line is about to be modified (step 412). The line is then modified (step 414). A determination is made as to whether there are more requests to process (decision 416). If there are more requests to process, decision 416 branches to "yes" branch 418, whereupon processing continues at step 402. If there are no more requests to process, decision 416 branches to "no" branch 420, whereupon processing ends at 450.

Returning to decision 404, if the request is not a modify line request, decision 404 branches to "no" branch 408 whereupon it is determined if the request is an update request (decision 422). Note that an update request is a request received from another CPU requesting the data for a line that has been modified. In other words, another CPU in the system has determined that it is a frequent accessor of a line that has been modified, and so, rather than invalidating the line, the other CPU requests the data to modify its copy of the line. If it is determined that the request is an update request, decision 422 branches to "yes" branch 424 whereupon the data that was written to the line is retrieved (step 428). The data is then sent on the bus (step 430). Processing then continues at decision 416 as described above.

Figure 5:
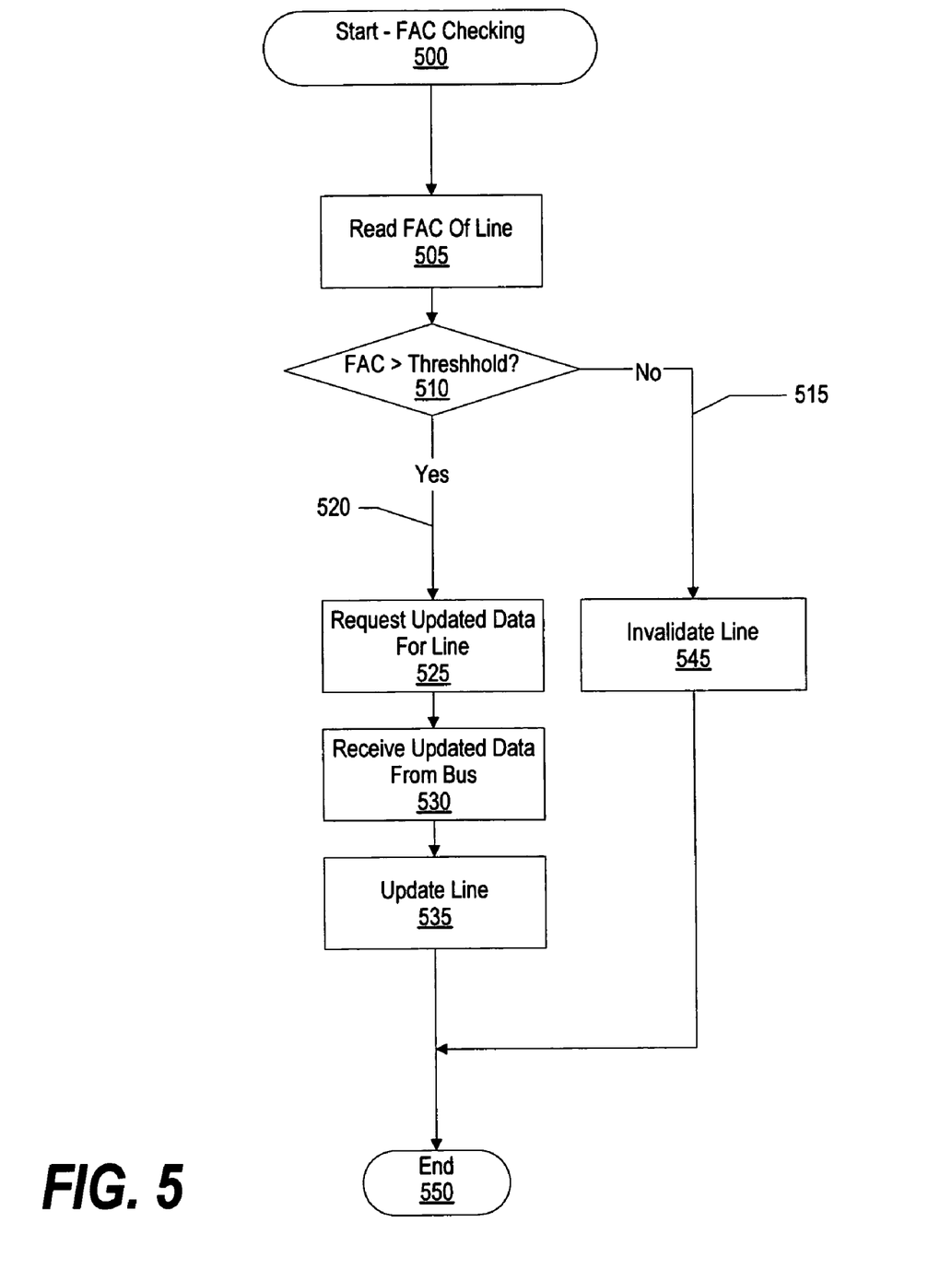
FIG. 5 is a flowchart that depicts checking a frequency access count in order to determine if a processor frequently accesses a line.

Returning to decision 422, if it is determined that the request is not an update request, decision 422 branches to "no" branch 426, whereupon it is determined if the request is an invalidate signal (decision 432). Note that an invalidate signal is received when another CPU in the system has modified a line. If it is determined that the request is an invalidate signal, decision 432 branches to "yes" branch 434 whereupon the FAC is checked to determine whether the CPU is a frequent accessor and should therefore update the line (predefined process 438) as depicted in FIG. 5. Processing then continues at decision 416.

If it is determined that the request is not an invalidate signal, decision 432 branches to "no" branch 436 whereupon the request is processed (step 440). Processing then continues at decision 416.

FIG. 5 is a flowchart that depicts checking a frequency access count in order to determine if a processor frequently accesses a line. Processing commences at 500 whereupon the frequency access count (FAC) is read. Note that the FAC is read for a line for which an invalidate signal has been received. A determination is made as to whether the FAC is greater than a predefined threshold (decision 510). If it is determined that the FAC is not greater than the threshold, decision 510 branches to "no" branch 515 whereupon the line is invalidated (step 545), typically by setting a validation bit to "N" or "0." Processing then ends at 550. If, however, it is determined that the FAC is greater than the threshold, decision 510 branches to "yes" branch 520 whereupon the CPU sends an update request in order to obtain the modified data for the line (step 525). In response to sending the update request, the updated data is received from the bus (step 530) and the line is updated in the private cache (step 535). Processing then ends at 550.

Figure 6A:
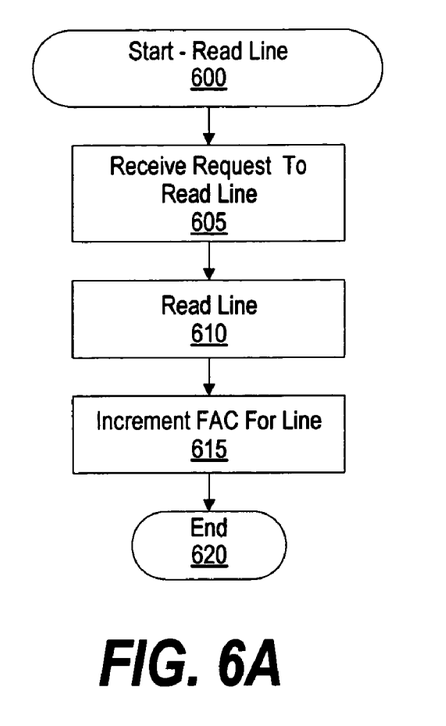
FIG. 6A is a flowchart that depicts reading a line and updating a frequency access count.

FIG. 6A is a flowchart that depicts reading a line and updating a frequency access count. Processing commences at 600 whereupon a request is received to read a line (step 605). The line is read (step 610) and the frequency access count (FAC) for the line is incremented (step 615). Processing ends at 620. Those skilled in the art will understand that the line is read directly from the private cache if the line is present in the private cache. If the line is not present in the private cache, it will be retrieved from the shared memory (or paged or swapped in, if necessary). When a new line is brought into the private cache, its frequency access count will be initialized, most likely to zero.

Figure 6B:
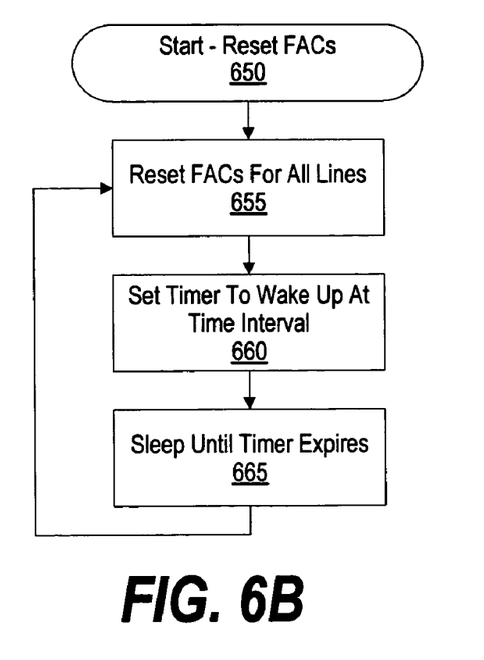
FIG. 6B is a flowchart that depicts resetting frequency access counters at a selected interval.

FIG. 6B is a flowchart that depicts resetting frequency access counts (FACs) at a selected interval. FACs should preferably be periodically reset in order to ensure that the most recent cache line access data is captured. There are many ways in which FACs may be reset. For example, all FACs in all private caches may be reset at a predefined time interval as depicted in FIG. 6B. As shown in FIG. 6B, processing commences at 650 whereupon the FACs are reset for all lines (step 655). A timer is set to wake up after a predetermined time interval has expired (step 660). The timer process then sleeps until the timer expires (step 665). After the timer expires, all FACs for all lines are again reset (step 655).

Figure 7:
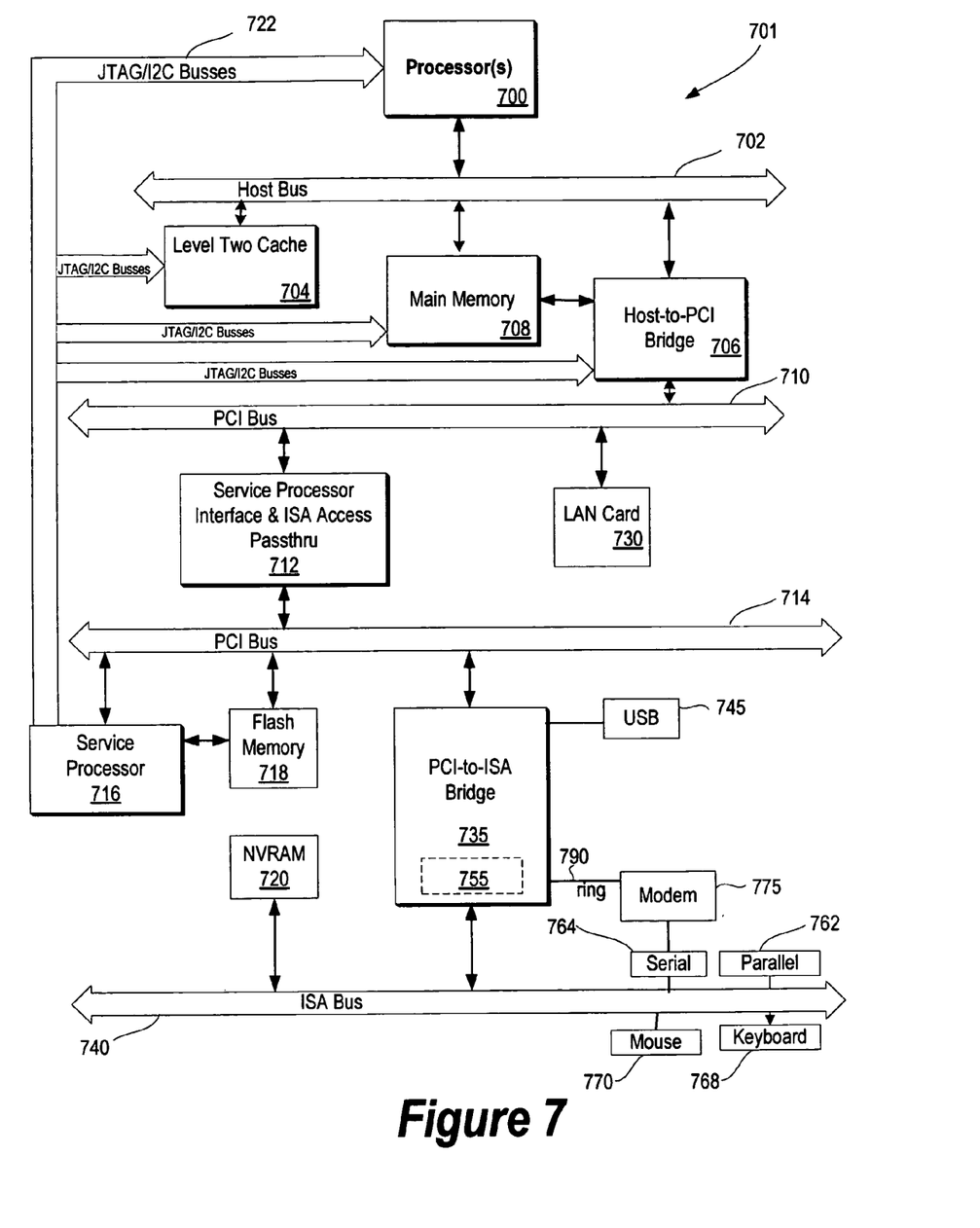
FIG. 7 is a block diagram of a computing device capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for providing memory coherence across a plurality of processors, said method comprising:

modifying, by a first processor, a first memory area associated with the first processor;

sending, by the first processor, an invalidate signal on a bus in response to the modifying;

receiving, by a second processor, the invalidate signal;

in response to receiving the invalidate signal:

reading, by the second processor, a frequency access count corresponding to a second memory area, the second memory area associated with the second processor and coherent with the first memory area, wherein the frequency access count corresponding to the second memory area is a number of times the second memory area has been accessed;

determining, based upon the frequency access count, if the second processor frequently accesses the second memory area; and in response to determining that the second processor frequently accesses the second memory area, sending, by the second processor, an update request on the bus;

receiving, by the first processor, the update request from the second processor; and in response to receiving the update request, sending, by the first processor, data stored in the first memory area on the bus.

2. The method of claim 1 wherein the first memory area and the second memory area are cache memories.

3. The method of claim 1 wherein the determining further comprises:

retrieving a threshold value;

comparing the frequency access count to the threshold value; and determining that the second processor frequently accesses the second memory area in response to the comparing.

4. The method of claim 1 further comprising:

receiving, by the second processor, the data sent on the bus by the first processor; and writing the received data to the second memory area.

5. The method of claim 1 further comprising:

receiving, by the first processor, a request to read the first memory area; and in response to receiving the request to read the first memory area, incrementing a frequency access count corresponding to the first memory area.

6. The method of claim 1 wherein the first memory area and the second memory area are selected from the group consisting of one or more cache lines, a memory page, and a memory segment.

7. The method of claim 1 further comprising:

resetting the frequency access count after a predetermined time interval.

* * * * *